Patented May 13, 1930

1,758,383

UNITED STATES PATENT OFFICE

HERMANN WAGNER, OF SODEN-ON-THE-TAUNUS, HEINZ EICHWEDE AND ERICH FISCHER, OF HOCHST-ON-THE-MAIN, GERMANY, ASSIGNORS TO GENERAL ANILINE WORKS, INC., OF NEW YORK, N. Y., A CORPORATION OF DELAWARE

AZO DYESTUFFS AND PROCESS OF PREPARING THEM

No Drawing. Application filed March 16, 1927, Serial No. 175,924, and in Germany March 31, 1926.

The present invention relates to new azo dyestuffs of the general formula:

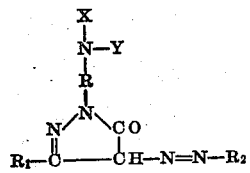

wherein Y denotes the residue of any carboxylic acid ester like the $COOC_2H_5$- or $CH_2.COOC_2H_5$-group; R and $R_2$ stand for aryl residues which may be substituted by any other group including the sulfo-, carboxyl- or hydroxyl groups; X may be hydrogen, alkyl, aryl or aralkyl and $R_1$ may be $CH_3$, COOH or COO-alkyl.

Our dyestuffs may be obtained by coupling any aromatic diazo compound with a pyrazolone of the general formula:

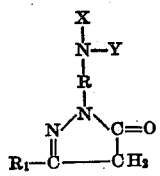

wherein Y, R, X and $R_1$ have the same significance as in the previous formula.

The pyrazolone compounds to be used as coupling components may be prepared, for instance, by causing chloro-formic ester chloroacetic ester or a similar body to act upon the corresponding aminoarylpyrazolones, if required, while adding an acid-binding agent as for example sodium acetate, chalk or the like.

The following examples serve to illustrate our invention but they are not intended to limit it thereto; the parts are by weight:

(1) 261 parts of the body of the following formula:

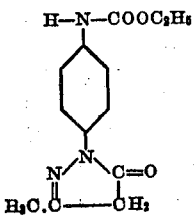

are dissolved in the cold in about 1000 parts of water while adding an equivalent quantity of an alkali, and the solution so obtained is neutralized with acetic acid. After having added to this solution about 180 parts of crystallized sodium acetate, there is run into the coupling liquid thus prepared a diazo solution obtained in known manner from 173 parts of ortho-aniline-sulfonic acid. The finished dyestuff separates in the course of the coupling process. It forms, when filtered and dried, a yellow powder easily soluble in water, which has the formula:

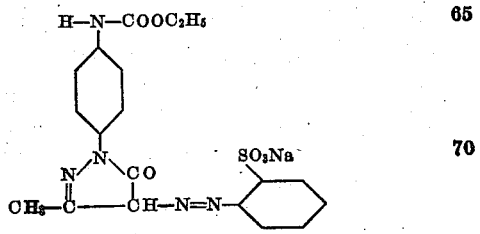

The dyestuff not only gives on wool yellow dyeings of excellent properties as to fastness, but it is particularly distinguished by its property of dyeing mixed textile goods made of wool and silk fibres very evenly and in an equal shade.

(2) 275 parts of the body of the formula:

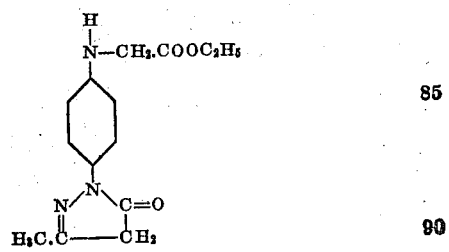

are worked up as indicated in Example 1 and combined with a diazo solution prepared from 173 parts of sulfanilic acid. After having stirred the reaction mass thus obtained for one or two hours, the dyestuff which has precipitated is filtered by suction and dried. It also forms a yellow powder easily soluble in water and having similar properties as the dyestuff obtained according to Example 1.

It has the following formula:

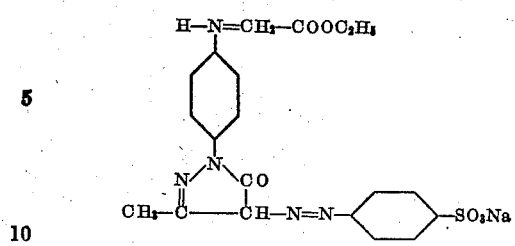

The pyrazolones and the diazo compounds above specified may be largely varied. The new pyrazolones may also be used as valuable coupling components in the preparation of dis- and poly-azo-dyestuffs.

If the dyestuffs are intended to be used for the preparation of very even tints on mixed textile goods made of wool and silk fibres, the combinations are advantageously selected in such a manner, that the dyestuff molecule does not contain more acid groups than are necessary for rendering the dyestuff soluble.

If anthranilic acid, ortho-aminophenol or derivatives of these compounds are used as diazo components, the dyestuffs or dyeings thus produced can be developed in known manner by afterchroming.

We claim:

1. The process of preparing azo dyestuffs which are particularly suitable for dyeing mixed textile goods made of wool, and silk fibres, which consists in coupling any aromatic diazo compound with a pyrazolone of the following general formula:

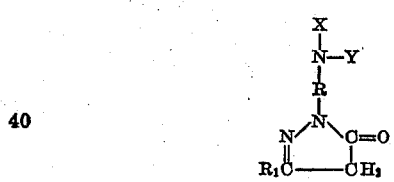

wherein Y stands for a carboxylic acid ester residue, R for an aryl residue substituted or not, X for hydrogen, alkyl, aryl or aralkyl and $R_1$ for $CH_3$, COOH or COO-alkyl.

2. The process of preparing azo dyestuffs which are particularly suitable for dyeing mixed textile goods made of wool and silk fibres, which consists in coupling any aromatic diazo compound with a pyrazolone of the following general formula:

wherein Y stands for a carboxylic acid ester residue.

3. The process of preparing azo dyestuffs which are particularly suitable for dyeing mixed textile goods made of wool and silk fibres, which consists in coupling any aromatic diazo compound with the pyrazolone of the following formula:

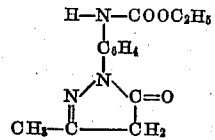

4. The process of preparing an azo dyestuff which is particularly suitable for dyeing mixed textile goods made of wool and silk fibres, which consists in coupling the diazo compound of ortho-aniline-sulfonic acid with the pyrazolone of the following formula:

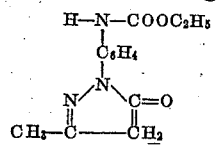

5. As new products azo dyestuffs of the general formula:

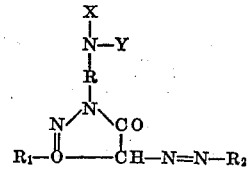

wherein Y stands for a carboxylic acid ester residue, R and $R_2$ stand for aryl residues which may be substituted, X stands for hydrogen, alkyl, aryl or aralkyl, and $R_1$ for $CH_3$, COOH or COO-alkyl, said dyestuffs being particularly suitable for dyeing mixed textile goods made of wool and silk fibers.

6. As new products azo dyestuffs of the formula:

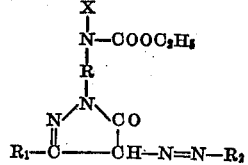

wherein R and $R_2$ stand for aryl residues which may be substituted, X stands for hydrogen, alkyl, aryl or aralkyl, and $R_1$ for $CH_3$, COOH or COO-alkyl, said dyestuffs being particularly suitable for dyeing textile goods made of wool and silk fibers.

7. As new products azo dyestuffs of the formula:

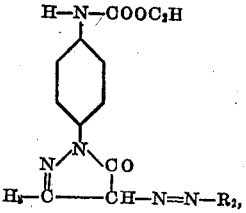

wherein $R_2$ stands for an aryl residue which may be substituted, said dyestuff being particularly suitable for dyeing textile goods made of wool and silk fibers.

8. As a new product the azo dyestuff of the formula:
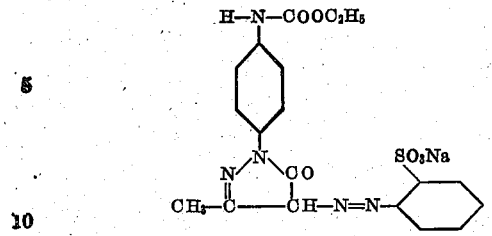
said dyestuff being particularly suitable for dyeing mixed textile goods made of wool and silk fibers yellow shades.
In testimony whereof, we affix our signatures.
HERMANN WAGNER.
HEINZ EICHWEDE.
ERICH FISCHER.